United States Patent
Shogren

[11] 3,788,740
[45] Jan. 29, 1974

[54] IMAGING SYSTEM
[75] Inventor: David K. Shogren, Ontario, N.Y.
[73] Assignee: Xerox Corporation, Stamford, Conn.
[22] Filed: Dec. 8, 1972
[21] Appl. No.: 313,213

[52] U.S. Cl.......................... 355/51, 350/187, 355/8
[51] Int. Cl. ......................................... G03b 27/50
[58] Field of Search ............... 95/4.5; 355/8, 50, 51; 350/187

[56] References Cited
UNITED STATES PATENTS

| | | |
|---|---|---|
| 3,592,542 | 7/1971 | Kaufer et al...................... 355/51 X |
| 3,598,489 | 8/1971 | Thomas et al........................ 355/51 |
| 3,614,222 | 10/1971 | Post et al................................. 355/8 |
| 3,689,145 | 9/1972 | Kawakubo et al....................... 355/8 |
| 3,700,325 | 10/1972 | Harper..................................... 355/8 |
| 3,709,592 | 1/1973 | Kawakubo et al....................... 355/8 |

*Primary Examiner*—Samuel S. Matthews
*Assistant Examiner*—Richard A. Wintercorn
*Attorney, Agent, or Firm*—James J. Ralabate et al.

[57] ABSTRACT

A lens strip optical system for use in a copying machine wherein the original to be copied is supported in a flat stationary condition and a flowing light image of the original is recorded upon a moving photosensitive member.

11 Claims, 6 Drawing Figures

IMAGING SYSTEM

This invention relates to an optical imaging device and, more particularly, to an optical imaging system of relatively short focal length for recording a flowing light image of a stationary original upon a moving photosensitive surface.

In an effort to conserve space in office copying machines, a unique optical imaging system having a relatively short conjugate length has been developed. This system, herein referred to as a lens strip optical system, is the subject matter of U.S. Pat. No. 3,584,950 to Gundlach and U.S. Pat. No. 3,584,952 to Gundlach et al. As disclosed in the Gundlach patents, this short focal length imaging system is conventionally made up of three superimposed lens strip elements with each lens strip containing a plurality of refracting lens elements. In practice, the refracting elements of each superimposed lens strip are coaxially aligned to form a number of three lens optical imaging devices capable of receiving light rays from a portion of an original and projecting the light rays towards an imaging plane. The three lens devices are arranged in a manner so that they coact to form a continuous image of the object viewed by the lens strip in a common viewing plane.

In its basic form, the lens strip system is not universally adaptable for use in all copying machine environments. This is particularly true in the case of a small xerographic copier where the original to be reproduced is held in a stationary condition and an image thereof is to be recorded on a moving photosensitive plate. One attempt to adapt a lens strip system to this type of machine environment is disclosed by Lewis et al. in U.S. Pat. No. 3,650,621. Here the original is supported upon an arcuate shaped platen and a lens strip device rotated through a curved path of travel below the platen surface to accomplish the desired scanning. As can be seen, the Lewis device requires the use of an undesirable contoured original support platen thus seriously restricting its effective utilization. The Lewis device also necessitates the use of a relatively gross mechanism to swing the lens strip element back and forth through the scanning cycle which tends to offset the space saving feature provided by the optical system.

It is therefore an object of the present invention to provide an optical imaging system having a relatively short focal length which is capable of recording an image of a flat stationary original upon a moving photosensitive surface.

It is a further object of the present invention to compress the optics utilized in an automatic copying machine.

It is another object of this invention to expand the application of the lens strip imaging system.

These and other objects of the present invention are attained in accordance with the present invention by an imaging system including a flat document support platen, an optical scanning device for scanning across an original supported upon the platen and directing a flowing light image thereof along a fixed optical path towards a moving photo-sensitive member, a short conjugate length lens system positioned in the light path between the scanning element and the photosensitive member, and means to adjust the lens system in response to the movement of the scanning element to record a continuous image having uniform magnification upon the moving photoconductive surface.

For a better understanding of this invention as well as other objects and further features thereof, reference is had to the following detailed description of the invention to be read in conjunction with the accompanying drawings wherein.

Figure 1:
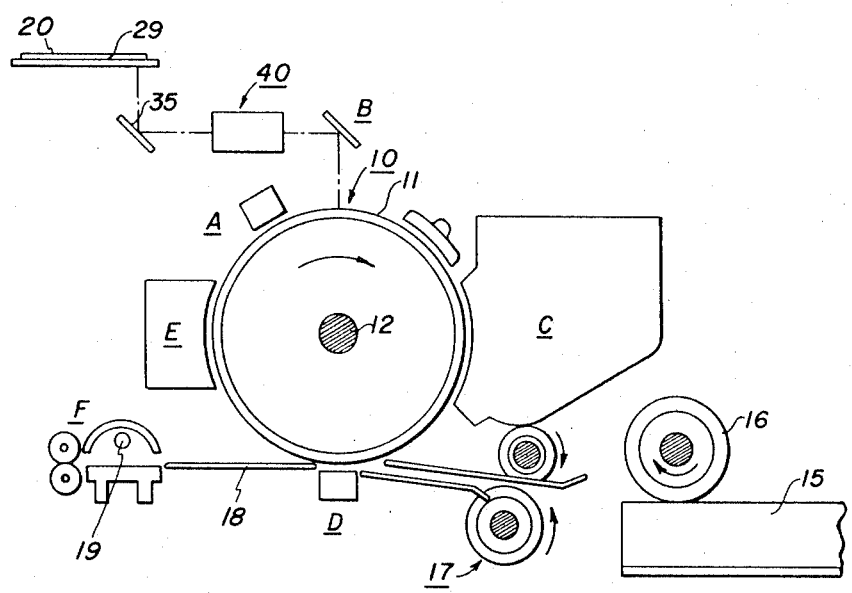
FIG. 1 is a schematic representation of an automatic xerographic copying machine utilizing the teachings of the present invention.

Referring now to FIG. 1 there is shown an automatic xerographic reproducing machine incorporating the optical scanning device of the present invention. The copying machine illustrated employs an image recording drum member 10 having an outer surface thereon coated with a photoconductive material 11. Selenium, which is well-known and used in the art for recording images of an original in the manner herein described, is a suitable coating material that can be utilized in the practice of the present invention. The drum, which is journaled for rotation within the machine frame by means of a shaft 12, is rotated in the direction indicated so as to move the photo-conductive recording surface through a plurality of xerographic processing stations to produce a visible rendition of the original. Although not show, it is understood that suitable means are also provided to both power and coordinate the movement of the various machine components whereby they act in concert to carry out the xerographic process.

Since the practice of xerography is well known in the art, the various processing stations for producing a copy of the original are herein represented in FIG. 1 as a series of blocks delineated A–E. At station A, an electrostatic charge is uniformly placed upon the photoconductive surface preparatory to the surface receiving a light image of the original to be reproduced. The charged drum surface is then moved through an exposure station B containing the scanning apparatus embodying the teachings of the present invention. Herein, a flowing light image of the original is recorded upon the drum surface in a manner to be described in greater detail below.

As a result of this imaging operation, the charge contained on the drum surface is selectively dissipated in the light exposed regions to record the original input scene information on the photoconductive surface in the form of a latent electrostatic image. Next, in the direction of drum rotation, the electrically imaged plate surfce is transported through a developing station C wherein a toner material is applied to the charged drum surface rendering the latent electrostatic image visible. The now developed image is brought into contact with a sheet of final support material, such as paper or the like, within a transfer station D wherein the toner is electrostatically attracted in image configuration from the photoconductive plate surface to the contacting side of the final support sheet. Any of the residual toner remaining on the drum surface, after the completion of the transfer operation, is cleaned therefrom within a cleaning station E thus placing the photoconductive plate in a condition to be once again reused in the xerographic recording process.

It is herein contemplated that the sheets of final support material processed in this automatic machine will be stored within the machine frame in a removable paper cassette 15. It is further contemplated that the automatic reproducing machine will possess the capability of accepting and processing copying sheets of various length, the length of the sheet selected being dictated by the format of the original input scene information to be reproduced. In operation, the individual sheets of support material are separated from the stack contained within the cassette and forwarded into the transfer station D in synchronous moving relationship with the developed xerographic images on the moving drum surface. Sheet feeding is accomplished by means of a feed roller 16 and a sheet registering device 17. The sheet roller acts to separate, via a reverse buckling operation, the uppermost sheet from the stack and then advance the sheet into the registration mechanism 17. Here, the motion of the leading edge of the sheet is momentarily interrupted while the sheet is properly aligned and registered with the image on the drum surface. Upon completion of the registration operation, the registering mechanism advances the sheet into the transfer station D where the image is placed upon the copy sheet in a manner described above. The image bearing sheet is separated from the drum and brought through a xerographic fusing station F by means of a conventional vacuum belt transport 18. In the fusing station, the xerographic toner image is heated to a temperature sufficient to fix the toner to the support sheet but insufficient to harm the sheet thus forming a permanent record of the original input scene information. Although any number of well known techniques can be employed to produce the desired image fixing, a radiant heat fuser 19 is herein employed.

Figure 2:
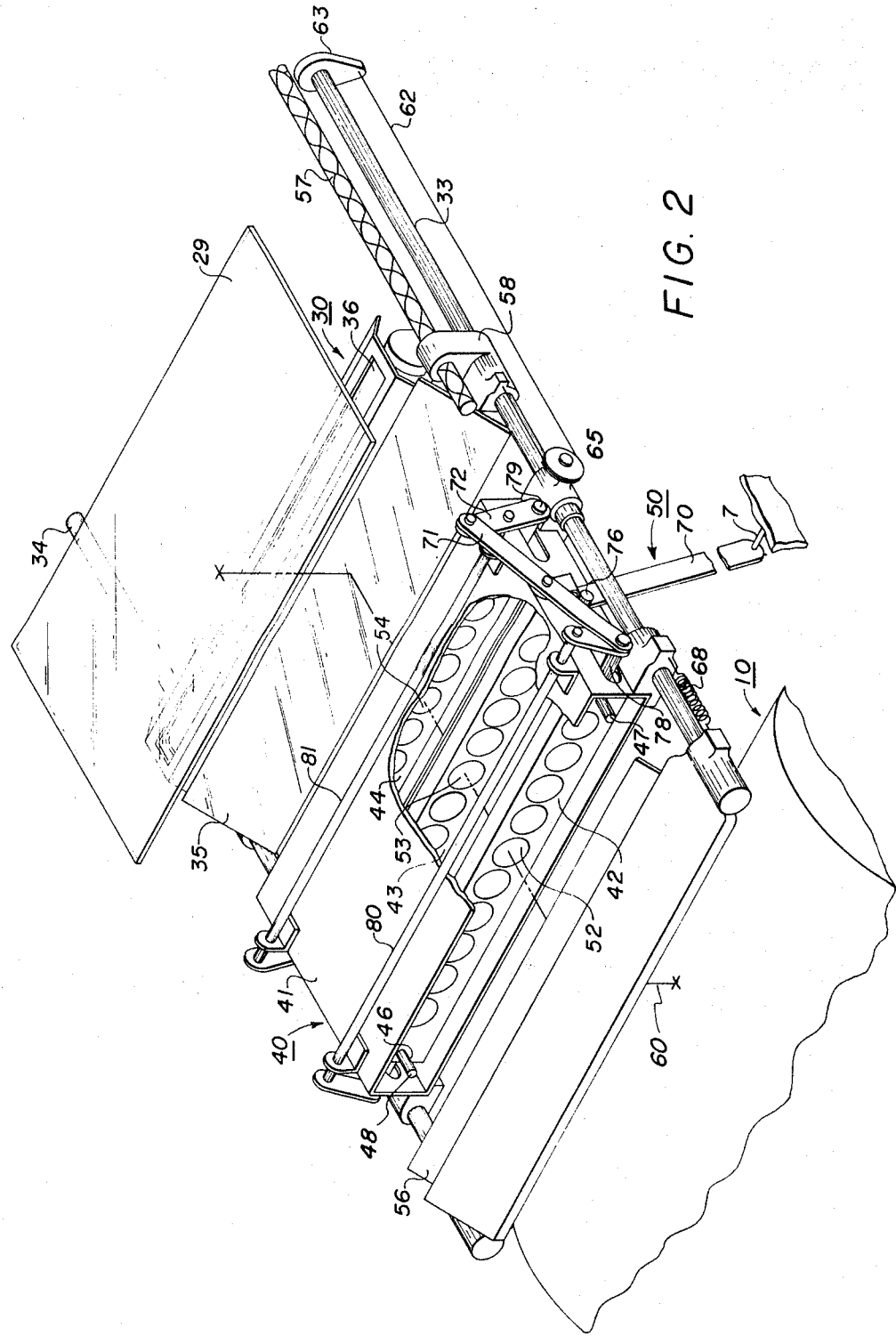
FIG. 2 is an enlarged partial perspective view of the short conjugate imaging system of the present invention as employed in the copying machine shown in FIG. 1.
Figure 3:
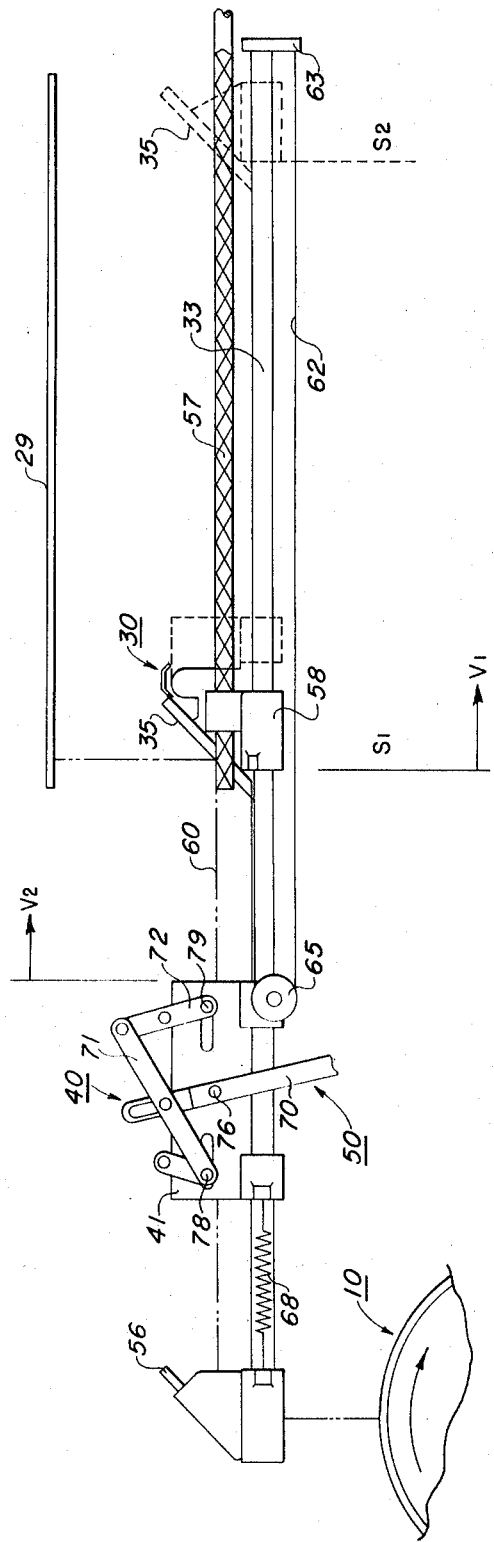
FIG. 3 is an enlarged side view of the imaging system illustrated in FIG. 2 showing the mechanism for coordinating the movement of the optical elements with a scanning element to maintain a constant magnification factor throughout the scanning pass.

Referring now more specifically to FIGS. 2 and 3, there is illustrated the optical scanning device of the present invention. A flat horizontal viewing platen 29 is carried in the upper portion of the machine frame upon which the original subject matter 20 to be reproduced is supported. A scanning carriage, generally referenced 30, is slidably mounted below the platen upon a pair of horizontally extended guide rails, 33, 34. A scanning device consisting of a planar reflecting surface 35 is fixed to the scanning carriage with the reflecting surface extending across the entire width of the platen substantially transverse to the direction of carriage movement. An aperture lamp 36 is also mounted upon the carriage behind the mirror and is arranged to illuminate an incremental area extending across the platen which is within the viewing domain of mirror 35.

A second optical carriage 40 is also slidably mounted upon the rails forward, in the direction of scan, of the scanning carriage (FIG. 2). The optical carriage includes a rectangular open-ended housing 41 in which is mounted the optical element of the present scanning system. The system is basically made up of a three element lens strip arrangement, as described in the heretofore mentioned Gundlach patents and comprises a central field strip 43 and two relay strips 42 and 44. The two outer or relay lens strip elements 42 and 44 are slidably supported inside the housing upon a pair of stationary parallel aligned slides 46, 47. A linkage mechanism 50 is operatively connected to the relay strips and, as will be described in greater detail below, coordinates their motion with the field strip during the scanning pass. The central lens strip, or field lens strip, is fixed in position about the central portion of the housing and is arranged to move therewith.

The three lens strip elements 42, 43 and 44 are exactly alike in construction and are fabricated to contain a plurality of refractory lenses in the manner set forth in the previously mentioned Gundlach patents. The strips are arranged so that each refractory lens element in the field strip is coaxially aligned with similar lenses mounted in the two relay lens strips and the three strip array is positioned within the optical light path of the scanning system. Each three lens unit therefore is made up of a single field lens 53 (FIG. 2) and two relay lenses 52 and 54 which view a small region of the illuminated area at the platen and project a light image thereof along fixed optical path 60 onto the moving drum surface via mirror 56. The combined effect of the plurality of three lens units is to project substantially the entire illumination area onto the drum surface.

A scanning drive is provided by means of a cylindrical cam 57 mounted above the right hand guide rail 33 and which is operatively connected to the hub 58 of the scanning mirror and carriage 30. A cam follower, mounted within the hub 58 rides within the grooves of the cylindrical cam member and translates a prescribed motion to the scanning carriage. The cam profile is generated so that the carriage is reciprocated back and forth beneath the platen when the cam is rotated in a single direction. As a result, the scanning mirror 35 is caused to traverse a path of travel parallel to the platen surface between a start of scan position $S_1$ as shown by the solid lines in FIG. 3 and an end of scan position $S_2$ which is depicted by the dotted lines in FIG. 3. Movement of the scanning carriage over the path of travel between $S_1$ and $S_2$ causes the reflecting surface 35 to scan or view the entire surface area of the platen and create a flowing light image of the subject matter supported thereon which is directed along the fixed light path toward the drum surface.

The rate ($V_1$) at which the scanning carriage is driven is controlled through the cam system to move the scanning mirror at a synchronous speed with the moving photoreceptor surface. The scanning carriage motion is further coordinated with that of the optics carriage by means of a pulley and cable arrangement as shown in FIGS. 2 and 3. A cable 62, which is anchored at one end at the main machine frame 63, is passed about a pulley 65, rotatably supported in the right hand side of the optical carriage, and the opposite end of the cable secured in the hub 58 of the scanning carriage. As the scanning carriage moves along its prescribed path of travel between positions $S_1$ and $S_2$ during the scanning phase of a copying cycle, the optics carriage is pulled along by the cable in the same direction as the scanning carriage. The velocity of the scanning carriage ($V_2$), is regulated by properly sizing the pulley diameter so that the optics carriage moves at exactly one-half the rate of the scanning carriage. A spring 68 is provided to insure the return of the optics carriage during the restoration phase of the cycle.

The central lens strip 43, herein referred to as the field lens strip, of the optical system is fixedly mounted within the optics housing 41 with the lens being perpendicular to the optical axis. At the start of scan position the field strip is positioned at the midpoint between the scanning mirror 35 and the photoreceptor surface. By regulating the rate of the optics carriage in the manner described, i.e., one-half that of the scanning carriage, the field lens strip will remain at the mid-conjugate position throughout the scanning phase of the copying cycle.

The outer two relay lens strips are arranged to move towards or away from the central field lens strip as the optical carriage moves through its prescribed path of travel. The motion imparted to the relay lens strips is controlled by a linkage 50 made up generally of an actuation arm 70, a cross link 71 and a motion reversing link 72. The actuation arm 70 is pinned at the lower end in the side wall 74 (FIG. 2) of the machine frame and pivotably mounted within the optical housing by means of a pivot pin 76. The cross link 71, which is pivotably mounted in the free end of the actuator arm, is operatively connected to both of the relay lens strips 42, 44 via shafts 78, 79, respectively, causing the strips to move along the slides. The right hand end of the cross link, as shown in FIG. 2, is connected to the shaft 78 by the reversing link which causes the relay strip 44 to move in opposition to but at the same rate as strip 42 as the actuating arm is rotated about pin 76. A pair of motion translator units 80 and 81, extending across the top of the housing, serve to impart the identical motion translated by the linkage to the opposite side of the lens strip element to prevent the strips from binding as they move along the slides 46 and 47.

Figure 5:
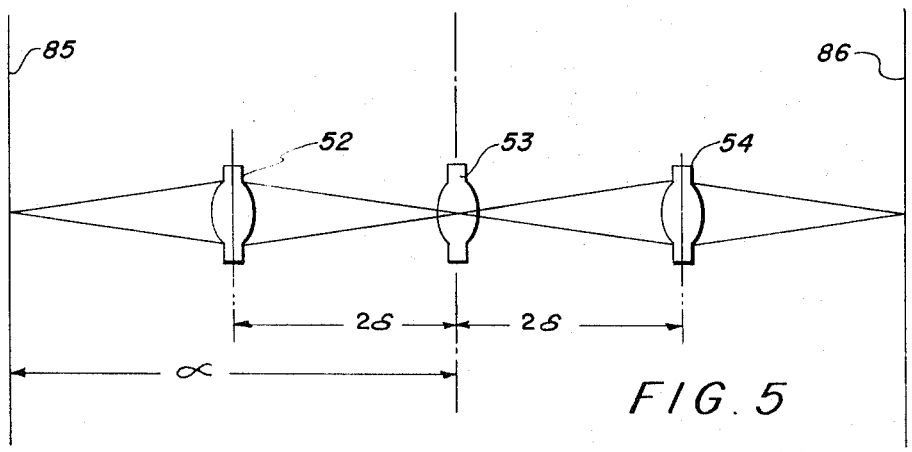
FIGS. 5–6 are schematic representations showing the relative position of the optical elements during various phases of a scanning pass.

FIG. 5 illustrates the relationship of the lens elements of a three lens unit when employed in a conventional system having a 1 to 1 magnification factor. Here, the conjugate distance is equal to four times the focal length ($\delta$) of the lens elements. The field lens 53 is positioned at the midpoint of the conjugate between the image plane 85 and the object plane 86, a distance from the image plane. The two relay lenses 52, 54 are centered between the field lens and the image and object planes 85 and 86, respectively so that no internal magnification is produced. As a result, the image projected onto the plane 85 is of the same size as an object supported in the object plane 86.

When the conjugate of the three element unit is changed, as for example by moving the object plane either towards or away from the lens system, the magnification factor of the system is changed. This unwanted resultant effect, however, can be offset by properly repositioning the lens elements along the optical path. For instance, if the object plane were to be moved in toward the image plane, the three lenses can be repositioned in the manner illustrated in FIG. 6 to maintain a 1 to 1 magnification ratio. To accomplish this end, the image is first internally magnified on the object side of the lens system and then proportionally minified internally on the opposite side of the system.

Figure 6:
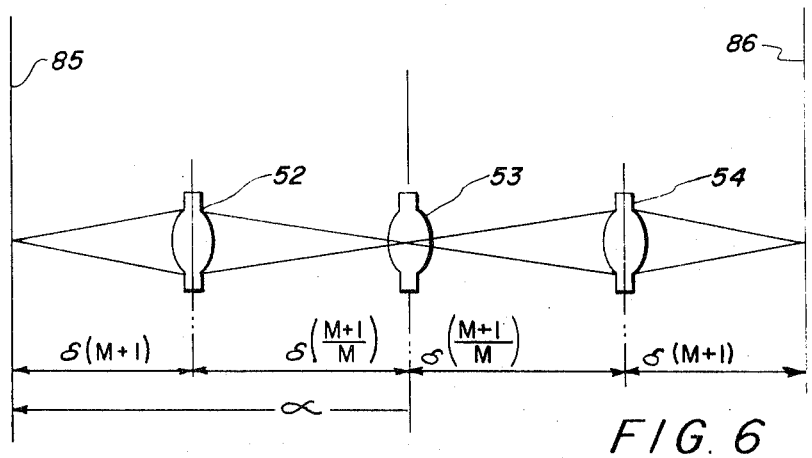

Referring now more specifically to FIG. 6, the object plane 86 is shown repositioned closer to the image plane 85 thereby shortening the conjugate from that shown in FIG. 5. As in the symmetrical arrangement described above, the field lens is again positioned at the mid-conjugate position wherein $\Delta$ is equal to one-half the total conjugate. The relay lens 53 closest to the object plane is then moved toward the object plane causing an internal magnification of the object to be produced on the object side of the field lens. Similarly, the other relay lens 52 is moved in closer to the field lens to a distance equal to the position of the first relay lens thus causing a minification of the image projected by the field lens which is equal but opposite to the magnification. The net result of the internal imaging is offsetting thus causing the total system magnification factor to remain the same.

The overall cange in the conjugate is relatd to the magnification or minification by the relationship:

$$\alpha = \delta (M + 1) + \delta (M + 1/M)$$

(1)

where:
  $\alpha$ is the overall conjugate between the back focal plane of the lens and the object plane,
  $\alpha$ is the focal length of the lens element.
  M is the magnification factor.

The first term of the above-noted relationship represents the distance from the object or plane 86 to the closest relay lens 53 while the second term represents the distance from the relay lens to the back focal plane of the lens element. From this relationship it can be seen that by moving the relay lens 53 toward the object plane some distance less than twice the focal length of the lens will result in the creation of a magnified image in the back focal plane of the lens. By placing a field lens 53 in the focal plane of the object relay lens and constructing a second relay system that is similar to the first but optically reversed, the internally magnified intermediate image is reduced exactly the same amount as it was previously magnified so that a 1 to 1 system is maintained even though the conjugate lens between the object and image plane has been reduced.

In the present scanning system the above-noted relationship is utilized to maintain a 1 to 1 system while the conjugate distance is continually changing during a scanning pass. As explained above, the motion of the two carraiges is coordinated through the cable and pulley arrangement so that the field strip is maintained at the midpoint of the conjugate between the scanning element and the moving photo-receptor surface as the conjugate changes. However, in order to maintain the correct relationship between the object and image relay strips and the field strip, the two outer relay strips are moved towards the field lens as the conjugate is being expanded in a manner wherein the 1 to 1 magnification factor is continually maintained. The magnification can be described for any given conjugate length by the following relationship:

$$M = \alpha - 2\delta \pm \sqrt{\alpha^2 - 4\alpha\delta}/2\delta$$

(2)

By applying this relationship and relationship (1) noted above, a motion can be ascertained or plotted for the relay strips which, if applied to the strips, will produce an internal magnification and minification which will maintain the overall system magnification to regain a unit throughout the scanning pass. The control linkage is specifically designed to impart this particular motion to the relay strip elements as the optical carriage moves over its prescribed path of travel.

Figure 4:
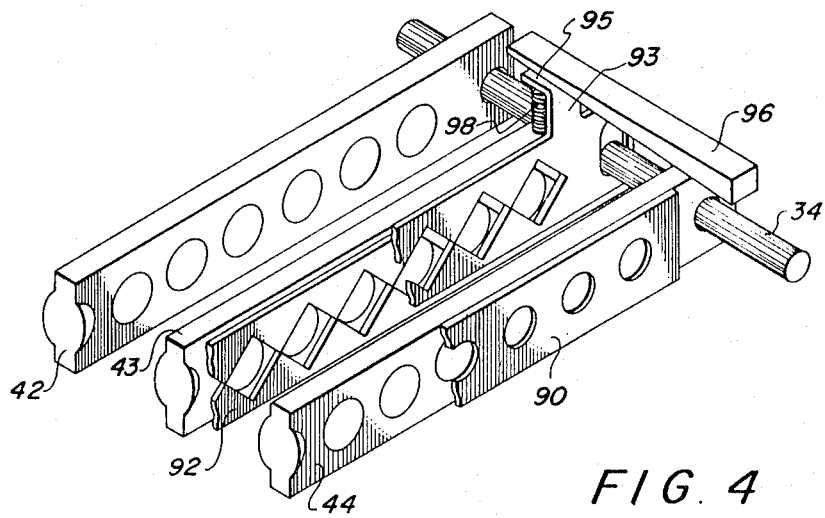
FIG. 4 is a partial perspective view of the optical elements utilized in the imaging system of the present invention showing means for adjusting the field stop aperture of the system.

It should also be noted that as the internal magnification of the system is changed, the f/no. of the system must also be changed in order to maintain a constant illumination of the photoreceptor surface. In this particular invention, an adjustable field stop is provided which is capable of being constantly adjusted as the optical carriage is moved through a scanning pass to accomplish the desired results. As shown in FIG. 4, the light rays passing through each of any three elements imaging unit is controlled by means of aperture stop plate 90 positioned in front of the relay lens 53 and an adjustable field stop 91 which is positioned adjacent to the field stop strip. The adjustable field stop can be of most any shape, however, a rectangular diamond is shown herein for illustrative purposes. The adjustable field stop is composed of a first fixed plate 92 mounted in fixed relation with the field lens strip and an outer slidable plate 93 mounted over the fixed plate 92. The slidably mounted plate 93 is provided with a turned L-shaped outer end surface 95 which is biased into sliding contact with an inclined plane 96 rigidly affixed to the side wall 97 of the machine frame, biasing being accomplished by means of a spring member 98. The working profile of the inclined plane is generated so that as the optical carriage is moved through a scanning pass the field stop opening will be expanded when the conjugate lens of the system is also being expanded. For further information concerning the use of an adjustable field stop in a lens strip system, reference is had to U.S. Pat. No. 3,544,190 issued in the name of Moorhusen et al.

While this invention has been described with reference to the structure disclosed herein and while certain theories have been expressed to explain the results obtained, it is not necessarily confined to the details as set forth and this application is intended to cover any modifications or changes that may come within the purposes and the scope of the following claims.

What is claimed is:

1. Apparatus for recording a light image of a stationary original upon a moving photosensitive member including an optical scanning element being arranged to scan across the stationary original to create a flowing light image thereof and direct the flowing light image along a fixed common optical axis towards an image plane through which the photosensitive member is moving, a movable lens system including at least one field lens having a relay lens movably mounted on either side thereof, the lens elements being coaxially aligned along sid common optical axis whereby the lens unit receives a light image directed along the optical axis by the sanning element and projects the light image towards the image plane, means to transport the field lens in response to the movement of the scanning element whereby the field lens is continually positioned at the midpoint between the image plane and the scanning element, and means operatively associated with said last mentioned means to move the two relay lens elements in response to the movement of the central lens element to minify each partial light image on one side of the field lens and to magnify the image on the opposite side of said field lens whereby the magnification of the system remains constant as the conjugate length thereof is changing.

2. The apparatus of claim 1 wherein the lens system is arranged to move in the same direction as the scanning element at a rate that is one-half the rate of the scanning element.

3. The apparatus of claim 1 wherein the relay lens elements are arranged to move towards and away from the field lens strip in synchronous relationship.

4. The apparatus of claim 1 wherein the relay lenses are continually positioned at a distance from the image and object planes of the system in accordance with the relationship $$d = \delta (M + 1) + \delta (M+1/M)$$

where:
 $d$ represents the distance along the optical axis from the image or object plane to the relay lens strip element
 $\delta$ represents the focal length of the lens
 $M$ is the magnification factor 5. The apparatus of claim 1 wherein the scanning element and the removal lens system are movably mounted upon a pair of guide rails.

6. The apparatus of claim 2 wherein the scanning element is a reflecting surface that is moved at a rate that is equal to the rate at which the photosensitive member is moving through the image plane.

7. The apparatus of claim 1 further including a flat stationary viewing platen for supporting the original in a relatively flat horizontal position.

8. The apparatus of claim 7 further including illuminating means arranged to move with the scanning element to illuminate an incremental area of the platen within the viewing domain of the scanning element.

9. The apparatus of claim 8 wherein the scanning element comprises a reflecting surface extending transversely across the width of the viewing platen.

10. The apparatus of claim 4 wherein the magnification is described by the relationship $$M = \alpha - 2\delta \pm \sqrt{\alpha^2 - 4 \alpha\delta/2 \delta}$$

11. In an optical scanning device of the type wherein an original to be copied is supported in a stationary condition upon a flat viewing platen and the original is scanned by a moving reflecting surface arranged to direct a flowing light image along a fixed optical path toward a photo-sensitive element moving through a fixed image plane, the improvement comprising a three element lens strip system including a central field strip having a relay strip positioned on either side thereof, the system being positioned in the fixed light path to receive light rays from the scanning element and project the rays towards the image plane, means to move the field strip along the midpoint of the optical path in response to the movement of the scanning element, and means to position the relay strips in response to the movement of the field strip to maintain the system's magnification factor constant as the conjugate length of the system is changing.

* * * * *